United States Patent [19]
Taniguchi et al.

[11] Patent Number: 6,064,498
[45] Date of Patent: May 16, 2000

[54] IMAGE FORMING APPARATUS

[75] Inventors: Susumu Taniguchi; Hideaki Kimata; Keiji Ban; Hiroyuki Arima; Masayuki Mizuno; Katsuhide Yamaguchi; Makoto Eki, all of Osaka, Japan

[73] Assignee: Kyocera Mita Corporation, Osaka, Japan

[21] Appl. No.: 08/971,923

[22] Filed: Nov. 10, 1997

[30] Foreign Application Priority Data

Nov. 15, 1996 [JP] Japan .................................... 8-305290

[51] Int. Cl.[7] ...................................................... H04N 1/04
[52] U.S. Cl. ........................................... 358/498; 271/3.03
[58] Field of Search .................................... 358/400, 401, 358/474, 496, 497, 498; 355/308, 233, 407, 127; 271/3.03, 3.14, 163, 164

[56] References Cited

U.S. PATENT DOCUMENTS

| | | | |
|---|---|---|---|
| 4,651,224 | 3/1987 | Watanabe | 358/498 |
| 4,974,020 | 11/1990 | Takamatsu | 355/208 |
| 5,128,763 | 7/1992 | Sakuragi | 358/498 |

*Primary Examiner*—Jerome Grant, II
*Attorney, Agent, or Firm*—Jordan and Hamburg LLP

[57] ABSTRACT

This invention relates to an image forming apparatus for recording an image on recording paper. The apparatus has a main base frame internally provided with an imaging unit for recording an image on recording paper, an upper frame disposed on the main base frame and pivotally movable about an axis of a pivot provided on one end of the upper frame corresponding to a rear side of the apparatus to open a front side of the apparatus, a document feeder unit disposed on the upper frame for feeding an original document set thereon toward the front side, a document discharge tray attached to the main base frame for receiving the document fed by the document feeder unit, and a recording paper discharge tray attached to the main base frame beneath the document discharge tray for receiving the recording paper carrying the recorded image. The document discharge tray and the recording paper discharge tray are integrally attached to the main base frame via a tray frame to form a one piece unit.

5 Claims, 7 Drawing Sheets

IMAGE FORMING APPARATUS

BACKGROUND OF THE INVENTION

1. Field of the Invention

This invention relates to an image forming apparatus such as a copying-machine, a facsimile machine, a printer, and a compound machine having combined functions of these machines.

2. Description of the Background Art

There has been known a certain type of image forming apparatus with a frame structure comprising a main base frame internally provided with an imaging unit including a photoreceptor, and an upper frame vertically and pivotally openable about an axis of a pivot provided on one end thereof (e.g., on the rear side of the apparatus) to open the opposite side (e.g., the front side of the apparatus). The upper frame has an operation unit arranged with ten keys, a start key, etc. The apparatus further comprises a document feeder unit mounted on the upper frame to automatically feed original documents successively.

The document feeder unit comprises a housing member directly mounted on the upper frame, a guide member linked to the rear side of the housing member (i.e., rear side of the apparatus) to be pivotable relative to the housing member, and a document feed roller mounted on the housing member and the guide member.

The above conventional apparatus is constructed such that a document insertion tray is provided on the front side of the housing member, while a document discharge tray is provided on the rear side of the housing member. A recording paper insertion tray is provided on the rear side of the housing member, underneath the document discharge tray to set a stack of recording paper and transport the same inside the main base frame. A recording paper discharge tray is provided on the front side of the main base frame, e.g., beneath the document insertion tray for receiving the recording paper with the image recorded by the imaging unit to discharge the same outside the main base frame.

In the image forming apparatus having the above arrangement, original documents set on the document insertion tray are fed one by one to a document reader unit including a contact type image sensor to have the image of each document read line after line. Each time the entire image of one original document is read by the document reader unit, the document is discharged onto the document discharge tray, thereby discharging the documents one after another.

In the meantime, a sheet of recording paper stacked on the recording paper insertion tray is transported inside the main base frame in synchronism with the above image reading operation by the document reader unit, and is discharged onto the recording paper discharge tray after the image recording by the imaging unit. In case where the recording paper is brought to a jammed state during the transport, an operator pivotally opens up the upper frame to make an opening on the upper front side of the apparatus, and removes the jammed recording paper through the opening.

The above conventional image forming apparatus has the following drawback. Since the document insertion tray is mounted on the frontal end of the housing member constituting the document feeder unit, the document insertion tray also pivotally moves together with the housing member that is directly mounted on the upper frame in opening up the upper frame.

Hence, the radius of locus defined by the pivotal movement of the upper frame becomes extensively large because the radius of locus is made up not only with the length of the upper frame also with the length of the tray extending from the frontal end of the upper frame i.e., a length from the pivotal shaft to the radial outermost end of the tray. This results in an inconvenience in opening and closing the upper frame.

The apparatus can take an arrangement other than the above in which the document insertion tray and the document discharge tray are mounted in the opposite way, i.e., the document insertion tray is mounted on the rear side of the housing member, and the document discharge tray is mounted on the frontal end of the housing member. However, this arrangement also cannot avoid an extended radius of the upper frame when the upper frame pivotally moves, since the document discharge tray also pivotally moves together with the upper frame.

SUMMARY OF THE INVENTION

In view of the above drawbacks of the prior art, an object of this invention is to provide an image forming apparatus capable of shortening the radius of locus along which a distal end of an upper frame moves while opening the upper frame.

To accomplish the above object, this invention is directed to an image forming apparatus comprising: a main base frame; an upper frame pivotally disposed on the main base frame, rotatable about a pivotal axis on a rear end of the main base frame; a document feeder unit disposed on the upper frame for feeding an original document toward a front side of the apparatus; and a document discharge tray attached to the main base frame for receiving the original document fed by the document feeder unit such that the tray stays with the main base frame regardless of a movement of the upper frame.

With this arrangement, when the upper frame pivotally moves around the pivotal axis on the rear end of the main base frame in removing a jammed sheet stuck inside the apparatus and the like, the radius of locus of the upper frame, along which the upper frame pivotally moves, can be shortened since the tray does not pivotally move together with the upper frame when the upper frame is opened and closed. Thereby, opening and closing operations of the upper frame can be made easier.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
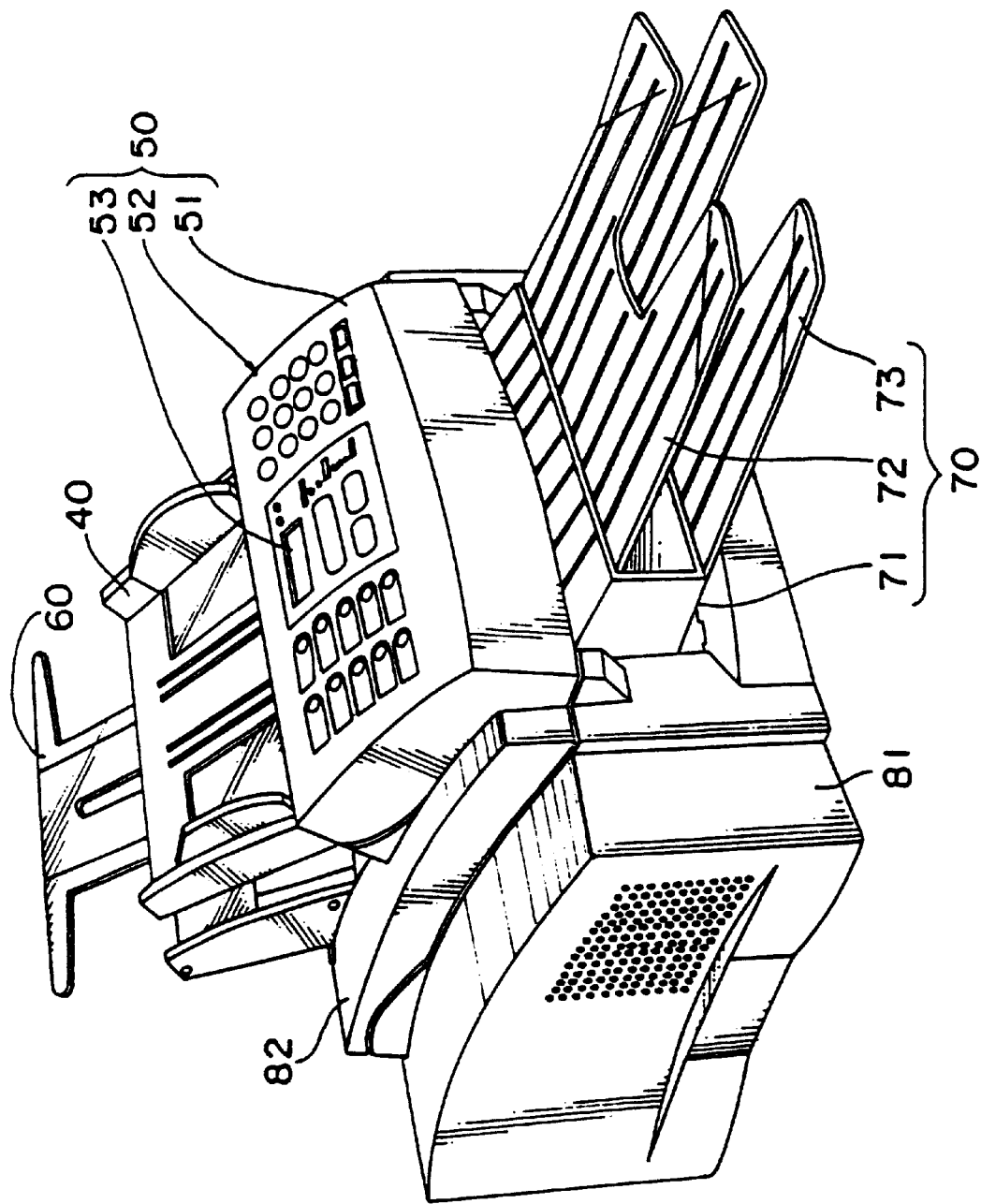
FIG. 1 is a perspective view of an external appearance of an embodiment of an image forming apparatus according to this invention.
Figure 2:
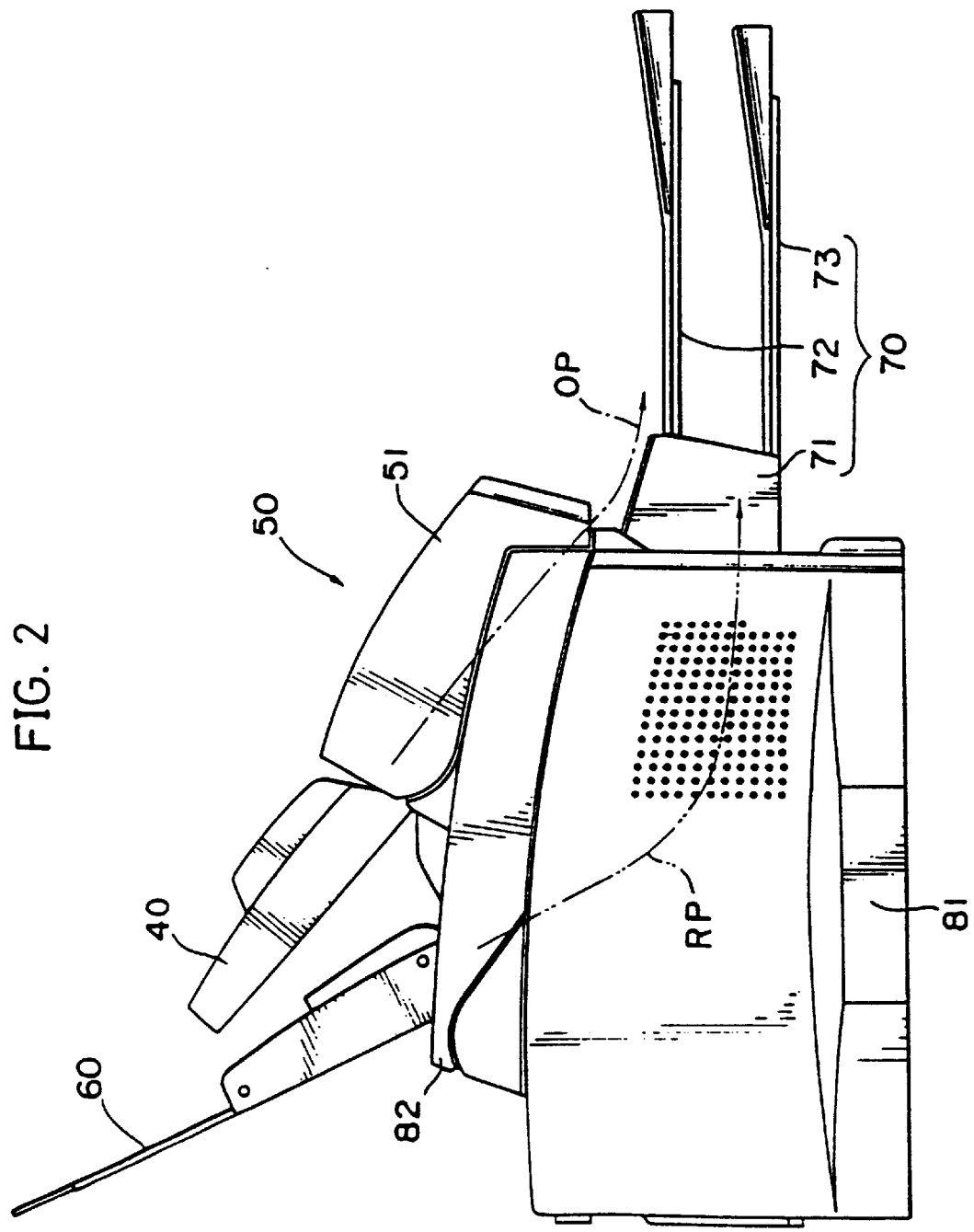
FIG. 2 is a side view of the image forming apparatus.

FIG. 1 is a perspective view of an external appearance of an image forming apparatus embodying this invention, and FIG. 2 is a side view of the apparatus. The image forming apparatus in this embodiment is a compound machine having functions as a facsimile machine and a copying machine.

Figure 3:
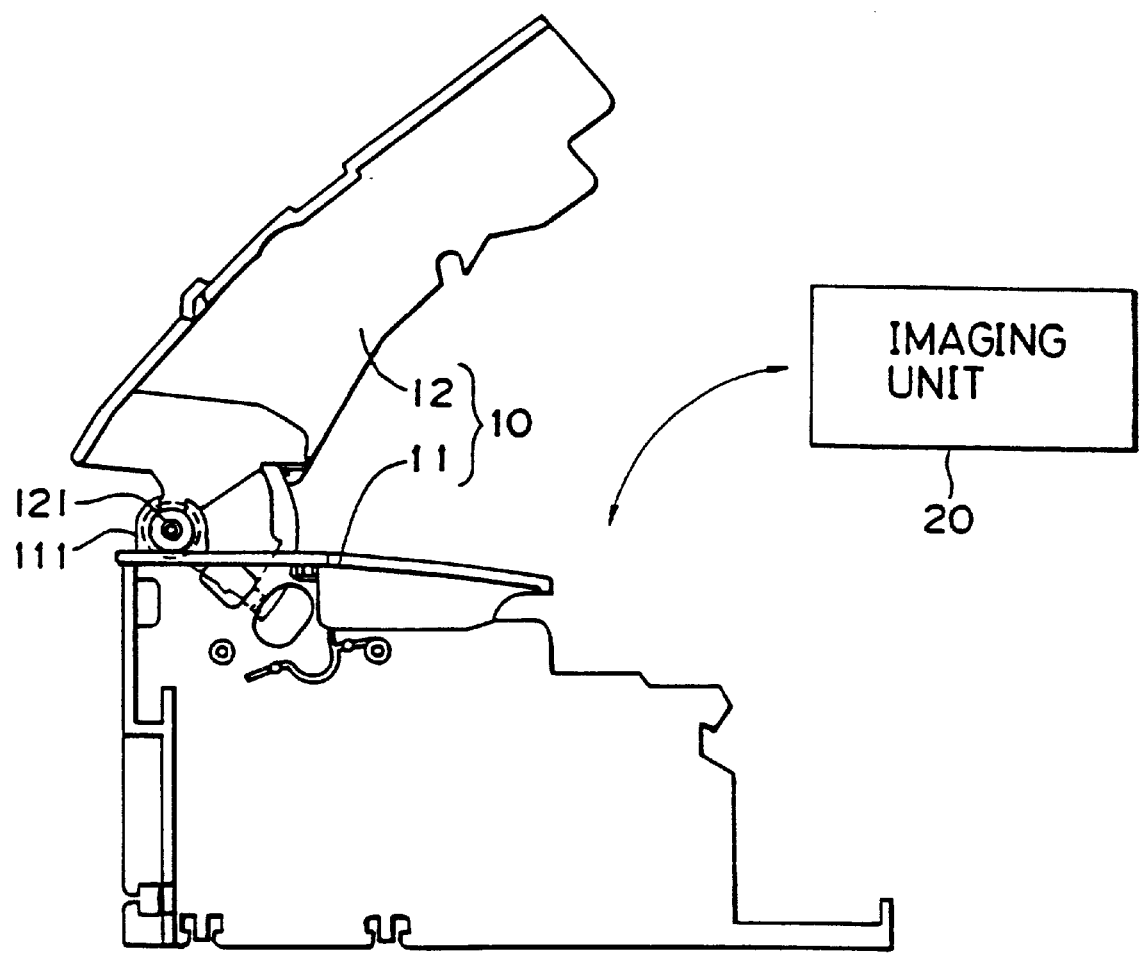
FIG. 3 is a side view of a frame structure of the image forming apparatus.

As shown in FIG. 3, the image forming apparatus has a frame body 10 consisting of a main base frame 11 located on the lower portion and an upper frame 12 located on the upper portion of the apparatus. The frame body 10 is provided with a pair of bearings 111 on the main base frame 11, at lateral ends (front and rear sides on the plane in FIG. 3) on the rear side (left side on the plane in FIG. 3) of the apparatus. The bearings 111 are projected upward (only one bearing is shown in FIG. 3). A shaft 121 extending in the front and rear direction on the plane in FIG. 3 is inserted in the bearings 111 and 111 to render the upper frame 12 pivotable about an axis thereof.

More specifically, the apparatus in this embodiment is of a so-called shell type such that the upper frame 12 pivotally swings around the axis of the shaft 121 to open and close relative to the main base frame 11. The shell type apparatus is constructed such that an operator can accommodate an imaging unit 20 with a photoreceptor inside the main base frame 11 or take out the accommodated imaging unit 20 through an opening defined on the upper front side (upper right side in FIG. 3) of the apparatus by opening up the upper frame 12. Further, this arrangement facilitates removal of jammed recording paper inside the apparatus.

It should be noted that, in this embodiment, copying operation and facsimile transmission/receiving are supposed to be performed on the side of an operation unit 50 (see FIG. 2). Accordingly, the side where the operation unit 50 is provided is referred to as "front side" of the apparatus, whereas the opposite side is referred to as "rear side" throughout the description.

The imaging unit 20 has a conventional arrangement except that it is detachably mounted inside the main base frame 11. Specifically, as will be described later, an image read by a contact type image scanner 33 or an image transmitted from a facsimile machine (external device) is exposed on the photoreceptor to form an electrostatic latent image, which in turn is developed into a toner image by a developing unit provided along a periphery of the photoreceptor. Then, the toner image is transferred by a transfer roller onto recording paper (cut sheet) transported from a recording paper insertion tray which is to be described later.

Figure 4:
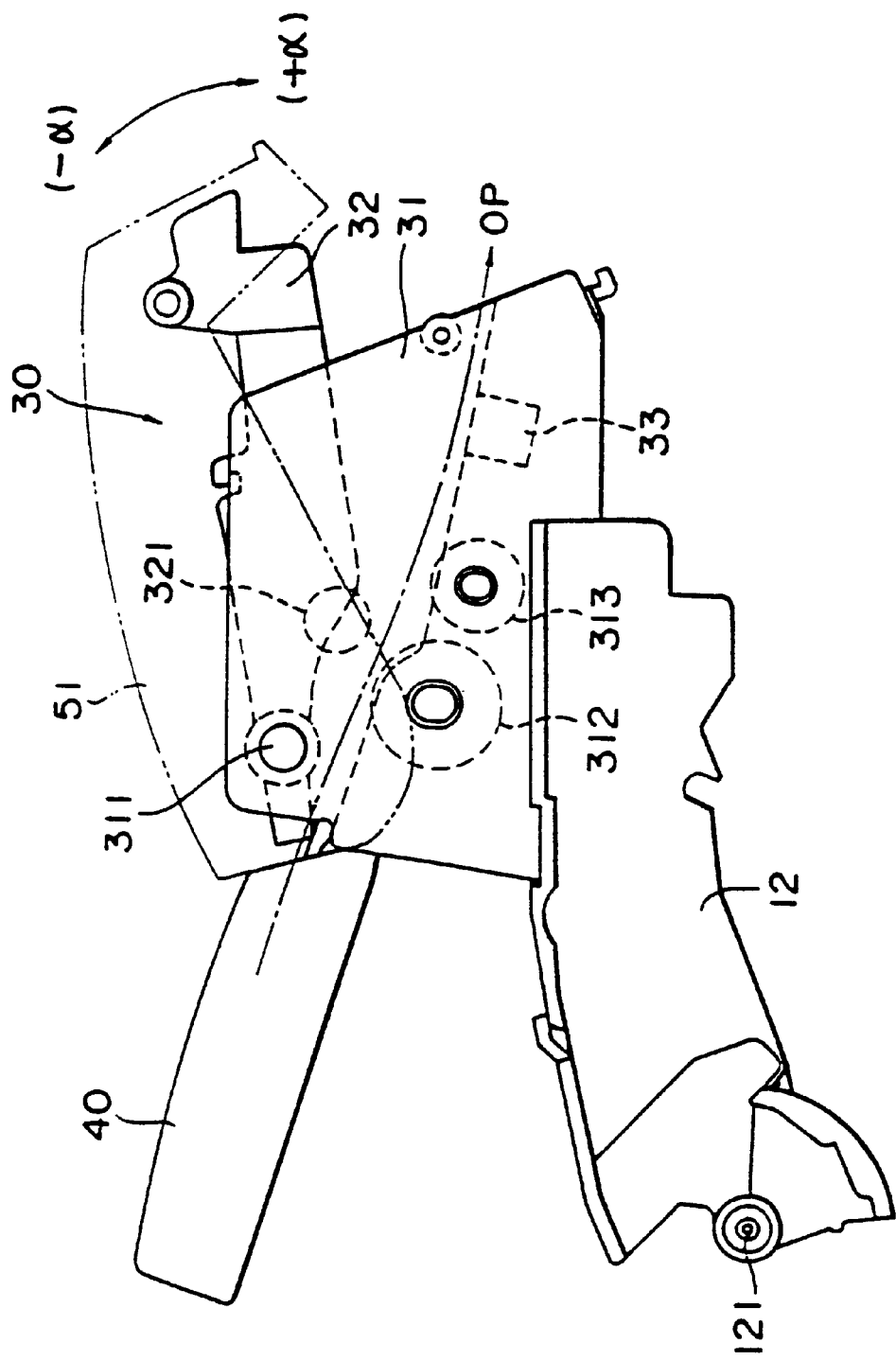
FIG. 4 is a side view showing essential parts of the image forming apparatus in a state where a document feeder unit is mounted on an upper frame of the apparatus.

As shown in FIG. 4, a document feeder unit 30 is mounted on the upper frame 12. The document feeder unit 30 is operated to automatically feed a stack of original documents placed thereon one by one while causing the contact type image scanner 33 to successively read an image of the original documents.

The document feeder unit 30 has a housing member 31 (hereinafter merely referred to as "housing member") which is directly mounted on the upper frame 12 to feed documents, and a document feed guide member (hereinafter also merely referred to as "guide member") 32 which is connected to a shaft 311 provided on the rear end (left side in FIG. 4) of the housing member 31 and is pivotally movable around an axis of the shaft 311 in the direction of (−α) and (+α). The document feeder unit 30 further comprises a document insertion tray 40 arranged on the rear side of the housing member 31.

Generally, the guide member 32 swings in the (+α) direction by its own weight to oppose to the housing member 31 in close contact state. In this state, when document feed rollers 312 and 313 disposed on the upper side of the housing member 31, and a document feed roller 321 disposed on the lower side of the guide member 32 are rotated, a stack of original documents set on the document insertion tray 40 are fed one by one in a state that each document is nipped between the rollers 321 and 312, and the rollers 321 and 313. Thus, the documents are fed one by one toward the front side (right side in FIG. 4) of the apparatus along an original document feed path OP shown by chain line with one dot in FIG. 4.

In this embodiment, the document feed rollers 312, 313, and 321 are all driven to rotate. Alternatively, at least one of these rollers 312, 313, and 321 may be driven, while the other two rollers are allowed to be rotated by the rotation of the drive roller to thereby feed the documents.

The elongated contact type image sensor 33 is mounted on the upper front side of the housing member 31. The image sensor 33 extends in a direction perpendicular to the plane of FIG. 4, and reads the image of a document fed by the document feeder unit 30 line after line. When the document passes the image sensor 33, the entire image of the document is read.

Referring back to FIGS. 1 and 2, in this embodiment, an operation cover 51 is provided to cover the document feeder unit 30 from above. On the upper surface of the operation cover 51, there are arranged various switches 52 such as ten keys and a start key, and a display portion 53 for displaying the telephone number for facsimile transmission/receiving and the operating status of the apparatus. The operation cover 51, the switches 52, and the display portion 53 constitute the operation unit 50.

With this arrangement, an operator performs facsimile and copying operation by pressing buttons of the operation unit 50 according to needs, and also confirms the operating status through contents displayed on the display portion 53.

Referring to FIG. 3, on the rear side of the upper frame 12, there is arranged the recording paper insertion tray 60 for setting a stack of recording paper (cut sheets). A stack of recording paper set on the recording paper insertion tray 60 are transported one by one along a recording paper transport path RP shown by chain line with two dots in FIG. 2. Specifically, recording paper is transported inside the apparatus along the transport path RP, has an image recorded on the recording paper by the imaging unit 20 based on an image read by the image scanner 33 or based on an image data transmitted from the external device, and then is discharged toward the front side of the apparatus.

In this way, the original documents after the image reading and the recording paper after the image recording are discharged toward the front side of the apparatus and received onto a tray unit 70 which is attached to the front side of the main base frame 11.

As shown in FIG. 2, the tray unit 70 includes a tray frame 71 detachably attached to the main base frame 11, and trays 72 and 73 both of which are detachably inserted in the tray frame 71 and are vertically spaced apart by a certain distance. The trays 72 and 73 have substantially the same configuration. In this embodiment, the upper tray 72 is used as a document discharge tray for discharging original documents and hereinafter also referred to as such, while the lower tray 73 is used as a recording paper discharge tray for discharging recording paper and hereinafter also referred to as such.

Figure 5A:
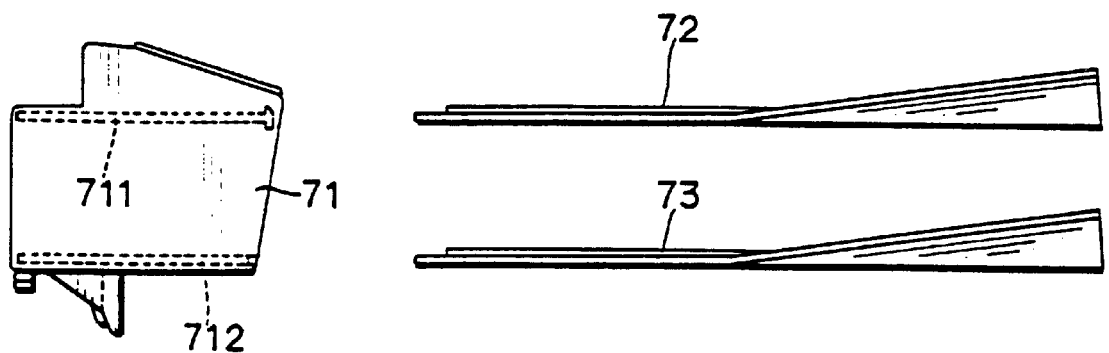
FIG. 5A is an exploded view of a tray unit incorporated in the image forming apparatus.

As shown in FIG. 5A, the tray frame 71 is formed with slide grooves 711 and 712 on opposite inner walls in a widthwise direction thereof. The slide grooves 711 and 712 are aligned with each other vertically spaced apart by a certain distance to respectively receive the base end (left end in FIG. 5A) of the document discharge tray 72 and the base end of the recording paper discharge tray 73.

Figure 5B:
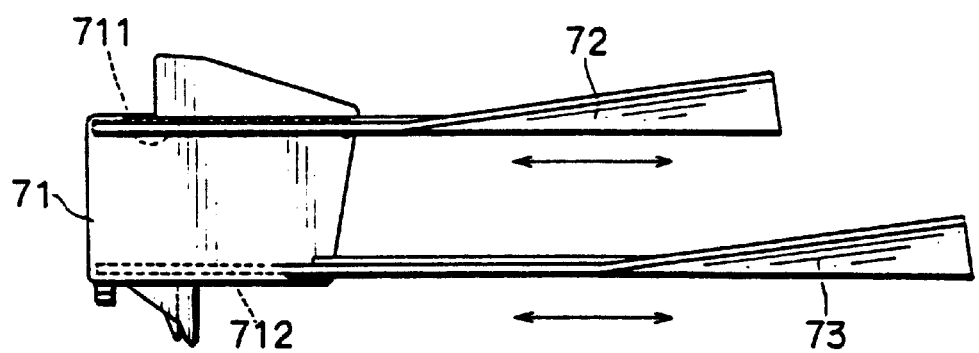
FIG. 5B is a diagram showing an assembled state of the tray unit.

As shown in FIG. 5B, the base end of the document discharge tray 72 and the base end of the recording paper discharge tray 73 are slidably inserted in the tray frame 71 while guided along the slide grooves 711 and 712 respectively. Thereby, the trays 72 and 73 are assembled together to form a one piece unit (tray unit 70) on the tray frame 71. Each of the trays 72 and 73 is slidable back and forth in the direction of arrow in FIG. 5B, thereby adjusting the length of the trays 72 and 73 in the front and rear direction of the apparatus in accordance with the size of original document and recording paper.

As an altered form, either one of the trays 72 and 73 may be slidable, while the other one may be fixed on the tray frame.

As mentioned above, the document discharge tray 72 and the recording paper discharge tray 73 are integrally attached to the tray frame 71 to form the tray unit 70. Accordingly, compared to the case where each of the trays 72 and 73 is individually attached to the main base frame 11, the rigidity of the apparatus as a whole is increased. In addition to this, since the trays 72 and 73 have substantially the same configuration, they can be molded with the use of a single die, thereby reducing the production cost of the apparatus.

Covers 81 and 82 are attached to the frame body 10 shown in FIG. 3 from outside to protect the internal parts of the apparatus.

According to the image forming apparatus of this invention, the document discharge tray 72 is attached to the main base frame 11. In other words, no tray is provided on the frontal end of the housing member 31 constituting the document feeder unit 30.

Figure 6:
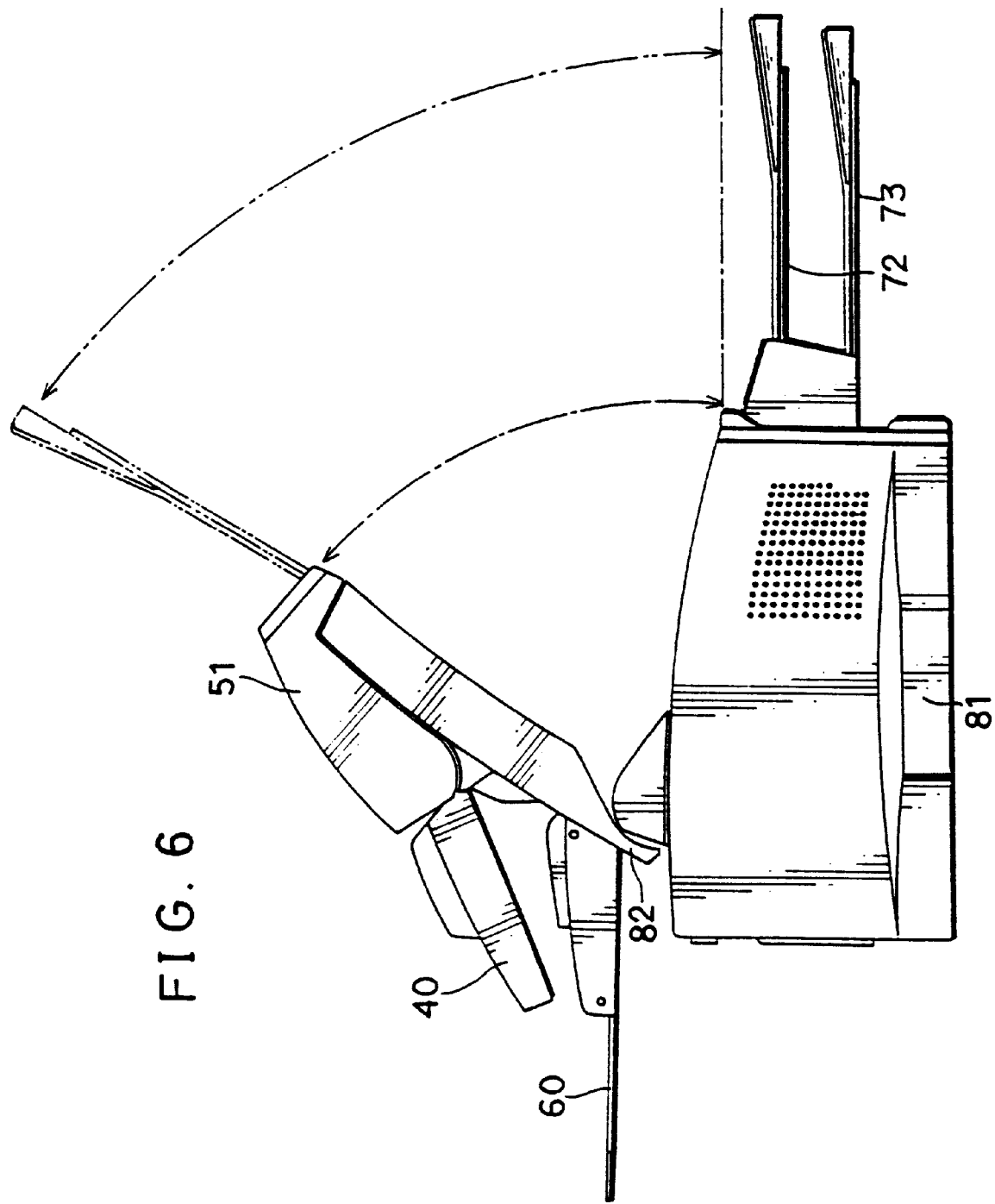
FIG. 6 is a diagram illustrating a locus defined by the radial outermost end of the upper frame when the upper frame of the apparatus pivotally moves up and down and that of a conventional apparatus.

Accordingly, as shown in FIG. 6, when the upper frame 12 pivotally opens upward (also see FIGS. 3 and 4) for removing a jammed sheet and the like, the locus (shown by chain line with one dot in FIG. 6) defined by the radial outermost end of the upper frame of the inventive apparatus is remarkably shorter than the locus (shown by chain line with two dots in FIG. 6 representing a conventional apparatus described in the foregoing section) defined by the radial outermost end of the upper frame of the conventional apparatus. Thereby, opening and closing operations of the upper frame of the inventive apparatus can be made easier.

Furthermore, since the document discharge tray 72 is attached to the main base frame 11, the document discharge tray 72 does not move together with the upper frame 12. Accordingly, there can be avoided a likelihood that an original document that has been received on the document discharge tray 72 may inadvertently slip off from the tray 72 during opening stage of the upper frame 12 to remove a jammed sheet and the like. Further, an operator can be free from a cumbersome operation of checking whether the document discharge tray 72 carries any original document before opening up the upper frame 12, and removing the same, if he/she finds any, from the tray 72 before opening up the upper frame 12.

In this embodiment, the tray unit 70 is constructed such that the document discharge tray 72 and the recording paper discharge tray 73 are slidably movable with respect to the main base frame 11. Alternatively, as shown in FIGS. 7A and 7B, a document discharge tray 75 and a recording paper discharge tray 76 may be engageably assembled together to form a one piece unit.

Figure 7A:
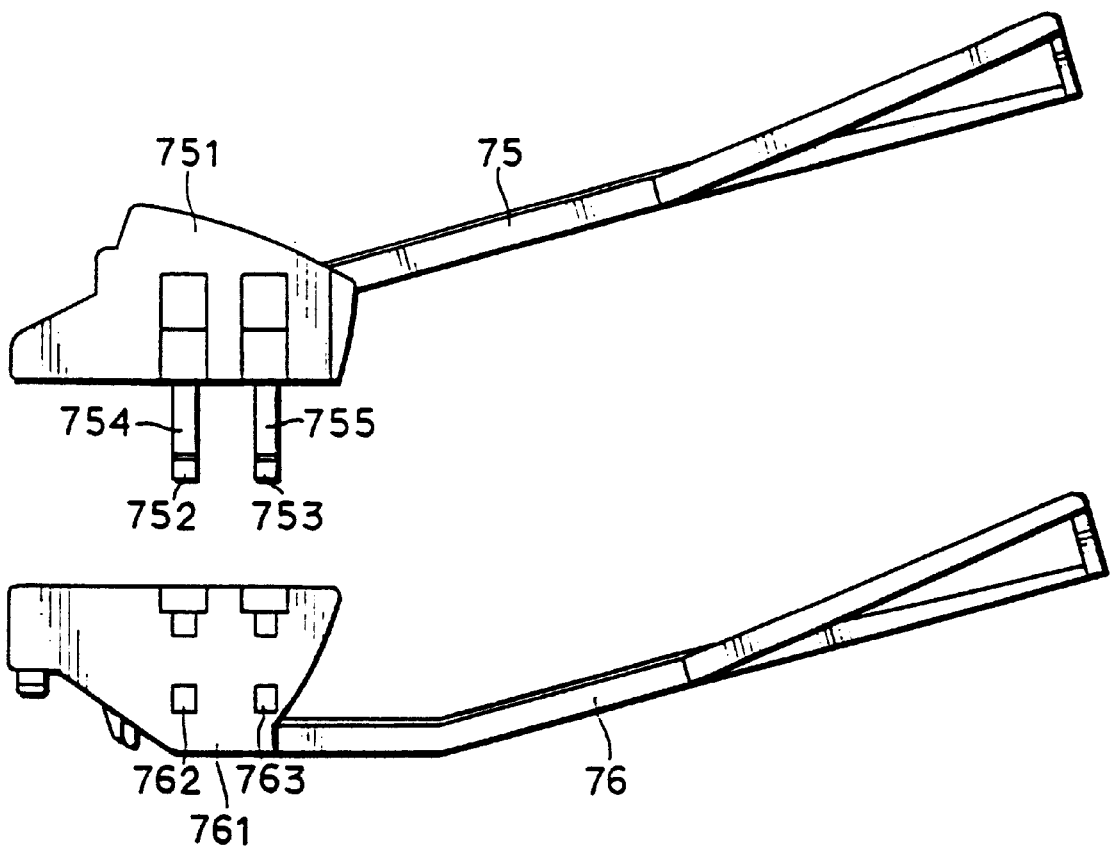
FIG. 7A is a diagram showing a modification of the tray unit.

More specifically, as shown in FIG. 7A, the document discharge tray 75 has a mounting member 751 at the base end thereof (left end in FIG. 7A) through which the tray 75 is to be attached to the main base frame 11. At each of opposite side walls of the mounting member 751 (i.e., in the front and rear direction in FIG. 7A), there are provided engaging members 754 and 755 projecting downward. The engaging members are shown only on one side wall in FIGS. 7A and 7B. The engaging members 754 and 755 are respectively formed with hooked portions (projections) 752 and 753 at the lead end thereof.

Similarly, the recording paper discharge tray 76 has a mounting member 761 at the base end thereof (left end in FIG. 7A) through which the tray 76 is to be attached to the main base frame 11. At each of opposite side walls of the mounting member 761 (i.e., in the front and rear direction in FIG. 7A), there are formed engaging holes 762 and 763 into which the corresponding projections 752 and 753 of the engaging members 754 and 755 are to be fittingly inserted. The holes of the mounting member 761 are shown only on one side wall in FIGS. 7A and 7B.

Figure 7B:
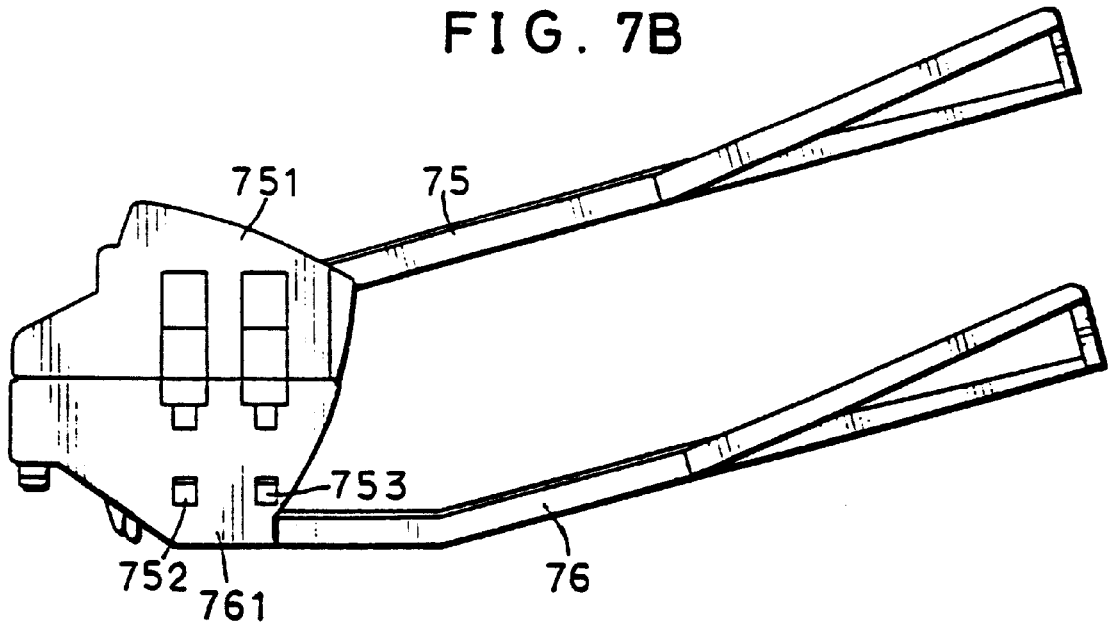
FIG. 7B is a diagram showing an assembled state of the modified tray unit.

Thus, as shown in FIG. 7B, when the projections 752 and 753 of the engaging members 754 and 755 of the document discharge tray 75 are fittingly inserted in the holes 762 and 763 of the recording paper discharge tray 76, the document discharge tray 75 and the recording paper discharge tray 76 are engaged with each other to form a one piece unit constituting the tray unit 70. Since the tray unit 70 is assembled as one piece unit, i.e., the trays 75 and 76 are fixedly attached to the main base frame 11 via the mounting members 751 and 761, the rigidity of this tray unit is further increased (compared to the tray unit in FIGS. 5A and 5B).

Further, the tray unit in this modification cab be assembled easily since the number of parts for the modified tray unit is lessened compared to the tray unit 70 in FIGS. 5A and 5B.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image forming apparatus comprising:

a main base frame;

an upper frame pivotally disposed on the main base frame, rotatable about a pivotal axis on a rear end of the main base frame;

a document feeder unit disposed on the upper frame for feeding an original document toward a front side of the apparatus; and a document discharge tray attached to the main base frame for receiving the original document fed by the document feeder unit such that the tray stays with the main base frame regardless of a movement of the upper frame;

an imaging unit arranged in the main base frame for recording an image of the original document on recording paper; and a recording paper discharge tray attached to the main base frame underneath the document discharge tray for receiving the recording paper carrying the image recorded by the imaging unit, wherein at least one of the document discharge tray and the recording paper discharge tray is slidably attached to the main base frame and wherein the document discharge tray and the recording paper discharge tray are attached to a tray frame detachably attached to the main base frame.

2. An image forming apparatus comprising:

a main base frame;

an imaging unit arranged in the main base frame for recording an image of the original document on recording paper;

an upper frame pivotally disposed on the main base frame, rotatable about a pivotal axis on a rear end of the main base frame;

a document feeder unit disposed on the upper frame for feeding an original document toward a front side of the apparatus;

a document discharge tray attached to the main base frame for receiving the original document fed by the document feeder unit such that the tray stays with the main base frame regardless of a movement of the upper frame; and a recording paper discharge tray attached to the main base frame underneath the document discharge tray for receiving the recording paper carrying the image recorded by the imaging unit, the document discharge tray and the recording paper discharge tray being constructed such that the trays are capable of being assembled together to form a one piece unit and attached to the main base frame as the one piece unit.

3. The image forming apparatus according to claim 2, wherein the document discharge tray and the recording paper discharge tray are assembled together with a mounting member, and the mounting member is detachably attached to the main base frame.

4. An image forming apparatus comprising:

a main base frame having a first end portion and a rear end portion;

an upper frame;

a pivotal device on the rear end portion of the main base frame for pivotably supporting the upper frame on the rear end portion of the main base frame;

a document feeder unit disposed on the upper frame for feeding an original document toward the front end portion of the main base frame;

a document discharge tray disposed on the front end portion of the main base frame for receiving the original document fed by the document feeder unit such that the document discharge tray stays with the main base frame regardless of the pivotal movement of the upper frame relative to the main base frame;

an imaging unit arranged in the main base frame for recording an image of the original document on recording paper;

a recording paper discharge tray disposed on the front end portion of the main base frame for receiving the recording paper carrying the image recorded by the imaging unit;

the document discharge tray and the recording paper discharge tray being attached to a tray frame, the tray frame being detachably attached to the main base frame.

5. An image forming apparatus comprising:

a main base frame having a first end portion and a rear end portion;

an upper frame;

a pivotal device on the rear end portion of the main base frame for pivotably supporting the upper frame on the rear end portion of the main base frame;

a document feeder unit disposed on the upper frame for feeding an original document toward the front end portion of the main base frame;

a document discharge tray disposed on the front end portion of the main base frame for receiving the original document fed by the document feeder unit such that the document discharge tray stays with the main base frame regardless of the pivotal movement of the upper frame relative to the main base frame;

an imaging unit arranged in the main base frame for recording an image of the original document on recording paper;

a recording paper discharge tray disposed on the front end portion of the main base frame for receiving the recording paper carrying the image recorded by the imaging unit;

the document discharge tray having a first mounting part and the recording paper discharge tray having a second mounting part, an attaching device attaching the first mounting part to the second mounting part to thereby form a double tray unit, and a connecting device connecting the double tray unit to the main base frame.

* * * * *